Sept. 27, 1949.  J. F. GOLDEN  2,483,043
FOLDING TABLE FOR AUTOMOBILE SEATS
Filed Oct. 15, 1946  2 Sheets-Sheet 1
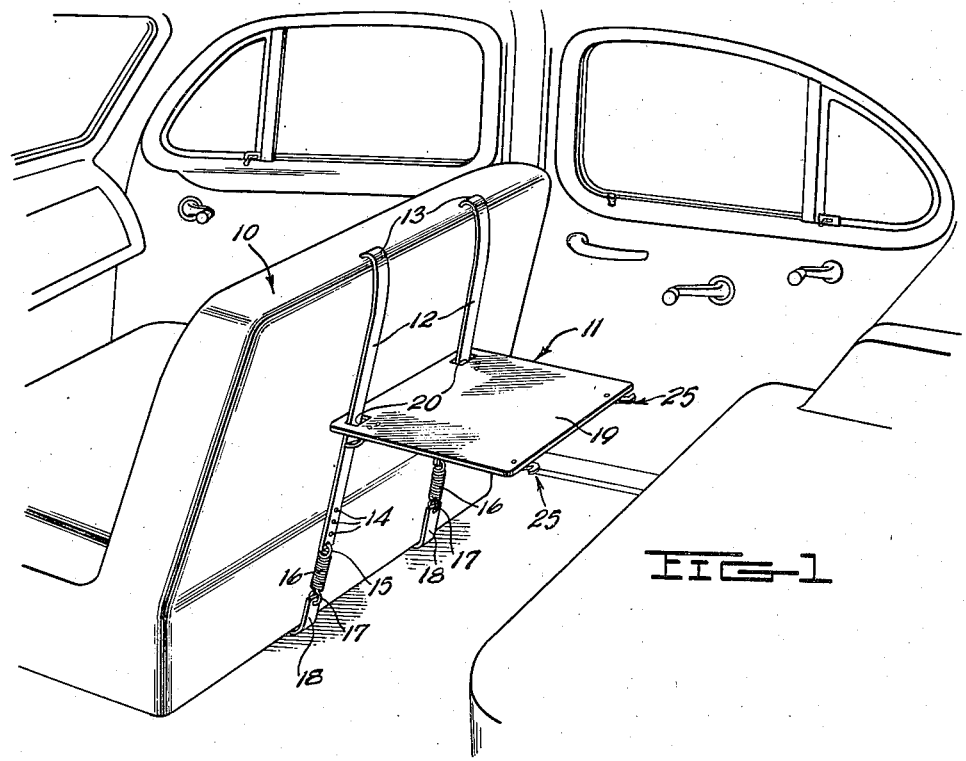
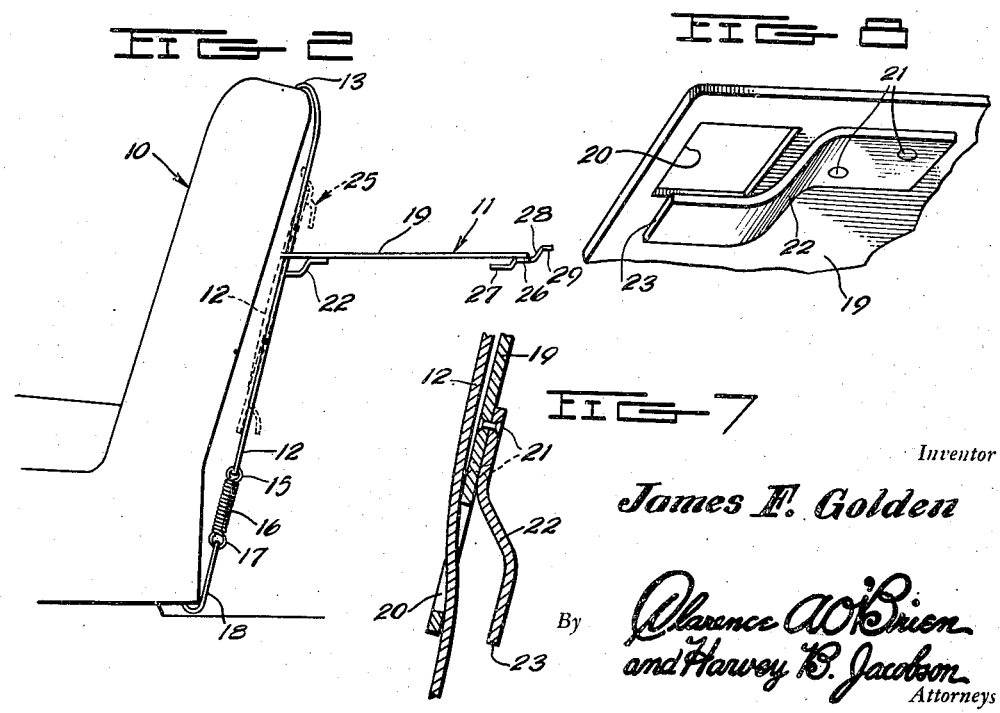
Inventor
James F. Golden
By Clarence A. O'Brien
and Harvey B. Jacobson
Attorneys Sept. 27, 1949.   J. F. GOLDEN   2,483,043
FOLDING TABLE FOR AUTOMOBILE SEATS
Filed Oct. 15, 1946   2 Sheets-Sheet 2
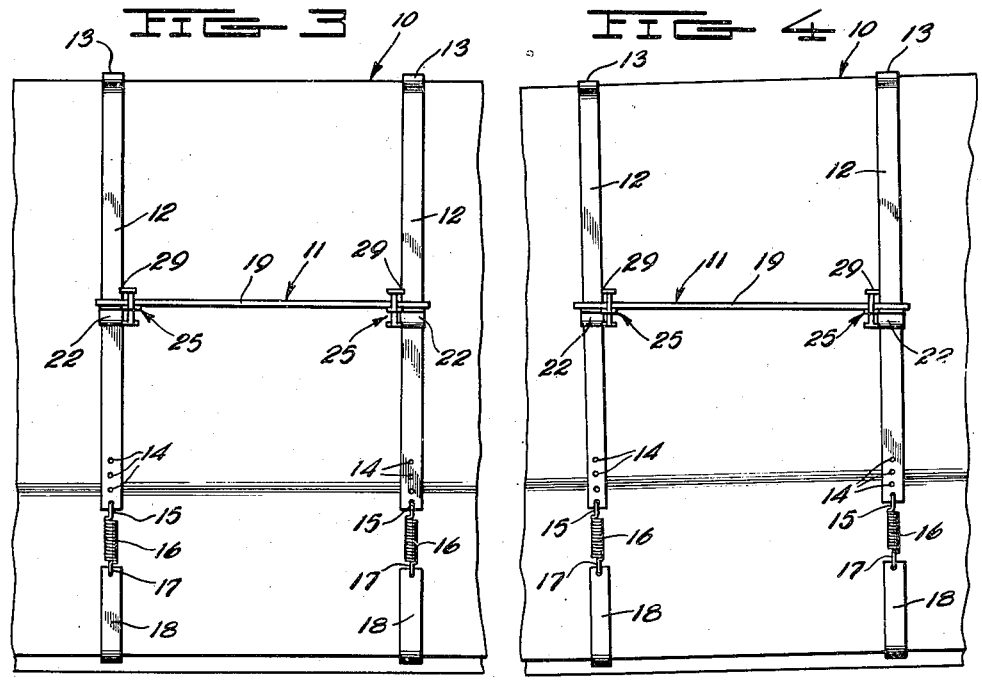
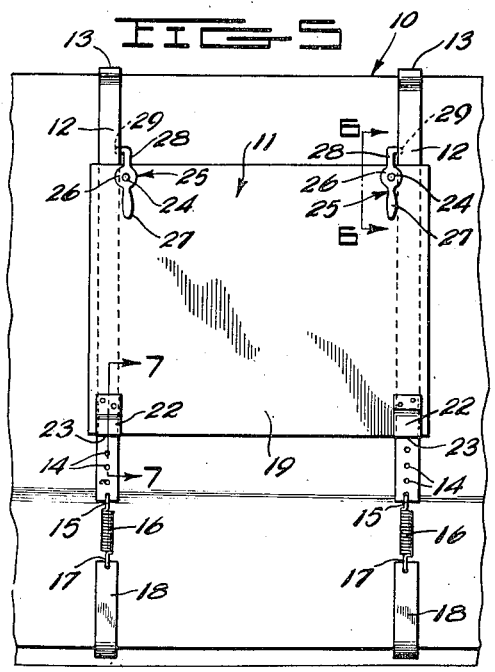
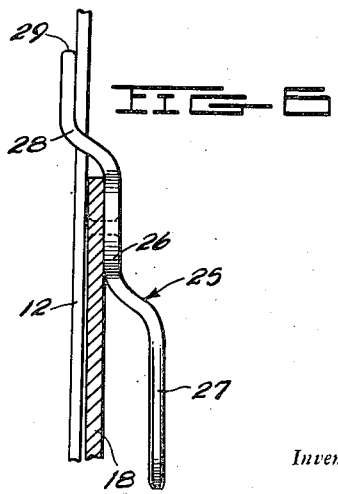
Inventor
James F. Golden
By Clarence A. O'Brien
and Harvey B. Jacobson
Attorneys Patented Sept. 27, 1949

2,483,043

UNITED STATES PATENT OFFICE 2,483,043

FOLDING TABLE FOR AUTOMOBILE SEATS

James F. Golden, Atlanta, Ga.

Application October 15, 1946, Serial No. 703,400

3 Claims. (Cl. 311—22)

1

This invention relates to a folding table and more particularly to a table attachment for a vehicle.

The primary object of the invention is to contribute to the comfort and convenience of the passengers of a vehicle, principally a private motor car.

Another object is to provide a convenient table which may serve as a support for cups, plates, sandwiches and the like during a luncheon period so that the various items will be within easy reach of the occupants of the vehicle.

A further object is to enable the table to be folded out of the way when not in use so as to not interfere with the comfort of the occupants of the vehicle.

The above and other objects may be attained by employing this invention which embodies among its features a pair of spaced supporting straps, means at opposite ends of the straps detachably to attach them to the back of a car seat, a tray having a pair of spaced strap receiving openings adjacent one edge and means on the underside of the tray adjacent each opening for engaging a strap and holding the tray in a horizontal plane. Other features include a hook at the upper end of each strap for engaging the upper edge of a vehicle seat back, a retractile coil spring attached to the lower end of each strap, a hook attached to the lower end of each spring for engaging the lower edge of the seat back, by which the straps may be detachably connected to the car seat, and adjacent the edge of the tray remote from that adjacent the openings for holding the tray in folded position against the back of the seat when it is not in use.

In the drawings Figure 1 is a perspective view of a conventional seat back illustrating this improved folding table in use, Figure 2 is an end view of the seat back and folding table illustrated in Figure 1, Figure 3 is a fragmentary rear view of Figure 1, Figure 4 is a view similar to Figure 3 illustrating the manner in which the table may be leveled should the vehicle be standing at an angle, Figure 5 is a view similar to Figure 3 showing the table folded out of the way, Figure 6 is an enlarged fragmentary sectional view taken substantially along the line 6—6 of Figure 5, Figure 7 is an enlarged fragmentary sectional view taken substantially along the line 7—7 of Figure 5, and Figure 8 is an enlarged fragmentary perspective view of one corner of the table illustrating the S-shaped bracket in detail.

Referring to the drawings in detail a seat back designated generally 10 is illustrated as having this improved folding table attached thereto. The table as a whole is designated generally 11 and comprises a pair of straps 12 each of which is formed at its upper end with a hook 13 adapted to engage over the upper edge of the seat back 10. Formed adjacent the lower end of each strap 12 is a row of longitudinally spaced openings 14 for the reception of the hooked upper end 15 of a retractile coil spring 16. The lower end of the spring 16 is provided with a hook 17 from which is suspended a seat back engaging hook 18 which is adapted to engage over the bottom edge of the seat back 10 as will be readily understood upon reference to Figures 1 and 2.

The table element proper of the invention comprises a rectangular tray 19 formed adjacent one edge with a pair of spaced openings 20. These openings as illustrated in Figure 8 are of rectangular form and are substantially square, with width slightly exceeding the width of the respective straps which they receive. Riveted or otherwise attached as at 21 to the underside of the tray 19 adjacent each opening 20 is a substantially S-shaped bracket 21 the rear edge 22 of which extends slightly beyond the rear wall of the opening 20 so that when the tray is in elevated position the angularity of the straps 12 will be compensated for and the tray will lie in a horizontal plane as it recedes from the straps.

Pivotally connected as at 24 to the underside of the tray adjacent the edge remote from that adjacent the openings 20 is a pair of spaced catches 25 each of which comprises a lever 26 having an offset handle portion 27 and an offset tongue 28 provided adjacent its end remote from the pivot with a laterally extending lug 29. These lugs 29 are adapted to engage behind the straps 12 when the tray 19 is in folded position as illustrated in Figure 5.

In use it will be understood that the straps 12 are attached to the back of the front seat of a vehicle as illustrated in Figure 1 so that they lie in spaced parallel relation and project through the openings 20 in the tray 19. When the table is in use the rear wall of each opening 20 is frictionally engaged by its respective strap 12 while the front face of each strap is engaged by the end 23 of the S-bracket 22. The frictional contact of the end 23 of the S-bracket against its respective strap cooperates with the frictional contact of the back wall of the opening 20 in holding the table at the proper elevation on the straps. Due to the fact that the end 23 of the respective S-brackets 22 extend toward the edge of the tray beyond the rear walls of the repective opening 20 it will be evident that the slope of the straps will be compensated for so that the tray will lie in a horizontal plane as it recedes from the straps. Should the vehicle be standing at an angle it is obvious that the tray may be leveled as illustrated in Figure 4 even though the upper and lower ends of one strap are either higher or lower than those of the other strap. In this way the table 19 may always be maintained level so as to avoid the spilling of liquids when cups or like vessels are placed on the table. When the table has served its purpose it is but a simple matter to lift the free end of the tray 19 and slide the opposite end thereof downwardly as suggested by the dotted lines in Figure 2 and then to swing the tray upwardly springing the straps 12 as illustrated in Figure 7 and by turning the catches 25 it will be obvious that the tongues 29 may be locked behind the straps 12 as illustrated in Figure 5 and the tray will be held upwardly against the straps and out of the way ready for instantaneous use.

While in the foregoing there has been shown and described the preferred embodiment of this invention it is to be understood that minor changes in the details of construction, combination and arrangement of parts may be resorted to without departing from the spirit and scope of the invention as claimed.

What I claim is:

1. A folding table attachment for a vehicle which includes a pair of spaced supporting straps, a hook at the upper end of each strap for engaging the upper edge of a vehicle seat back, a retractile spring attached to the lower end of each strap, a hook attached to the lower end of each spring for engaging the lower edge of the seat back, a tray having a pair of spaced strap receiving openings adjacent one edge, an S-shaped bracket secured to the underside of the tray adjacent each opening, said brackets having edges abutting the straps to hold the tray horizontal and catches rotatably connected to the tray adjacent the edge remote from that adjacent the openings for engagement with the under side of the straps when the tray is folded to hold the tray in a plane substantially parallel with the seat back.

2. A folding table attachment for a vehicle which includes a pair of spaced supporting straps, each of said straps having upper and lower sections, spring means joining the upper and lower sections of said straps, means on each of said sections for engaging the back of a car seat, a tray having a pair of spaced strap receiving openings adjacent one edge and arms on the under side of the tray adjacent each opening, said arms having edges adapted to engage the straps to hold the tray in a horizontal plane, and catches adjacent the other edge of the tray opposite the edge adjacent the openings, said catches including tongues for gripping the under side of said straps, said catches being rotatably secured to said tray for movement into engagement with the straps.

3. A folding table attachment for a vehicle which includes a pair of spaced supporting straps, each of said straps including an upper section and a lower section, hooks on each of said sections for engaging the back of a car seat, a tray having a pair of spaced strap receiving openings adjacent one edge, a substantially S-shaped bracket on the under side of the tray adjacent each opening and having an edge adapted to engage the front face of one of said straps to urge the back edge of each opening into contact with its respective strap and hold the tray in a horizonal plane, and catches adjacent the other edge of the tray opposite the edge adjacent the openings, said catches including tongues for gripping the under side of said straps, said catches being rotatably secured to said tray for movement into engagement with the straps.

JAMES F. GOLDEN.

REFERENCES CITED

The following references are of record in the file of this patent:

UNITED STATES PATENTS

| Number | Name | Date |
|---|---|---|
| 481,008 | Curtis | Aug. 16, 1892 |
| 534,686 | Falk | Feb. 26, 1895 |
| 554,661 | Doolittle | Feb. 18, 1896 |
| 555,583 | Pletcher | Mar. 3, 1896 |
| 907,501 | Jarrett | Dec. 22, 1908 |
| 1,258,072 | Wolf | Mar. 5, 1918 |
| 1,299,827 | Edwards | Apr. 8, 1919 |
| 1,442,879 | Heberling | Jan. 23, 1923 |
| 1,487,475 | Ribyat | Mar. 18, 1924 |
| 1,498,704 | Wetter | June 24, 1924 |
| 1,546,768 | West | July 21, 1925 |
| 1,555,038 | Thweatt | Sept. 29, 1925 |
| 1,666,293 | Lorton | Apr. 17, 1928 |
| 1,679,259 | Newman | July 31, 1928 |
| 1,699,975 | Lange | Jan. 22, 1929 |
| 1,849,446 | Bartlett | Mar. 15, 1932 |
| 1,925,523 | Cuff et al. | Sept. 5, 1933 |
| 2,168,210 | Hawksley | Aug. 1, 1939 |
| 2,282,663 | Majerus | May 12, 1942 |